Jan. 9, 1945.    M. P. WINTHER    2,367,163
ELECTROMAGNETIC APPARATUS
Filed March 2, 1944    6 Sheets-Sheet 3

Martin P. Winther,
Inventor.
Haynes and Koenig
Attorneys.

Jan. 9, 1945.  M. P. WINTHER  2,367,163
ELECTROMAGNETIC APPARATUS
Filed March 2, 1944  6 Sheets-Sheet 4

Martin P. Winther
Inventor.
Haynes and Koenig
Attorneys.

Jan. 9, 1945.   M. P. WINTHER   2,367,163
ELECTROMAGNETIC APPARATUS
Filed March 2, 1944   6 Sheets-Sheet 6

Martin P. Winther,
Inventor.
Haynes and Koenig,
Attorneys.

Patented Jan. 9, 1945

2,367,163

UNITED STATES PATENT OFFICE 2,367,163

ELECTROMAGNETIC APPARATUS

Martin P. Winther, Waukegan, Ill., assignor to himself, as trustee

Application March 2, 1944, Serial No. 524,715

14 Claims. (Cl. 188—104)

This invention relates to electromagnetic apparatus, and with regard to certain more specific features, to rotary liquid-cooled, eddy-current apparatus for use as a dynamometer, brake or the like.

The invention is an improvement upon the apparatus shown in the United States patent application of Charles T. Hayes, Serial No. 477,817, filed March 3, 1943, for Electromagnetic apparatus, eventuated as Patent 2,351,963, dated June 20, 1944.

Among the several objects of the invention may be noted the provision of improved structures for obtaining a very short axial water flow condition in the above-mentioned apparatus, which employs a thin sheet of water between its rotor and its stator; the provision of apparatus of the class described which effects the cooling of its eddy-current, heat-generating surfaces by means of a cooling medium applied both to the front and back of these surfaces, whereby high temperature gradients and distortions are reduced or eliminated; and the provision of apparatus of the class described which is simple, compact and economical to manufacture either in the form of a dynamometer or brake. Other objects will be in part obvious and in part pointed out hereinafter.

The invention accordingly comprises the elements and combinations of elements, features of construction and arrangements of parts which will be exemplified in the structures hereinafter described, and the scope of the application of which will be indicated in the following claims.

In the accompanying drawings, in which are illustrated several of various possible embodiments of the invention, Fig. 1 is a main vertical section (partially in elevation) of one form of the invention applied to a dynamometer construction;

Similar reference characters indicate corresponding parts throughout the several views of the drawings.

As disclosed in said Hayes patent, it is preferable that eddy-current apparatus such as a dynamometer be cooled by applying a thin film of water directly to the heating surfaces without flooding the stator compartment in which the rotor turns. A structure illustrating a cooling method by flooding is shown in Bernard Patent 2,188,398. Although the Hayes patented structure uses a mere rotating film of water on the eddy-current surfaces which is kept in motion by the rotor, only one side of the heating eddy-current surfaces is engaged by water. According to the present invention both sides of such surfaces are preferably serially engaged by water, and it is arranged for an axial flow on the inside surface which is inherently shorter than that shown by Hayes.

Figure 1:
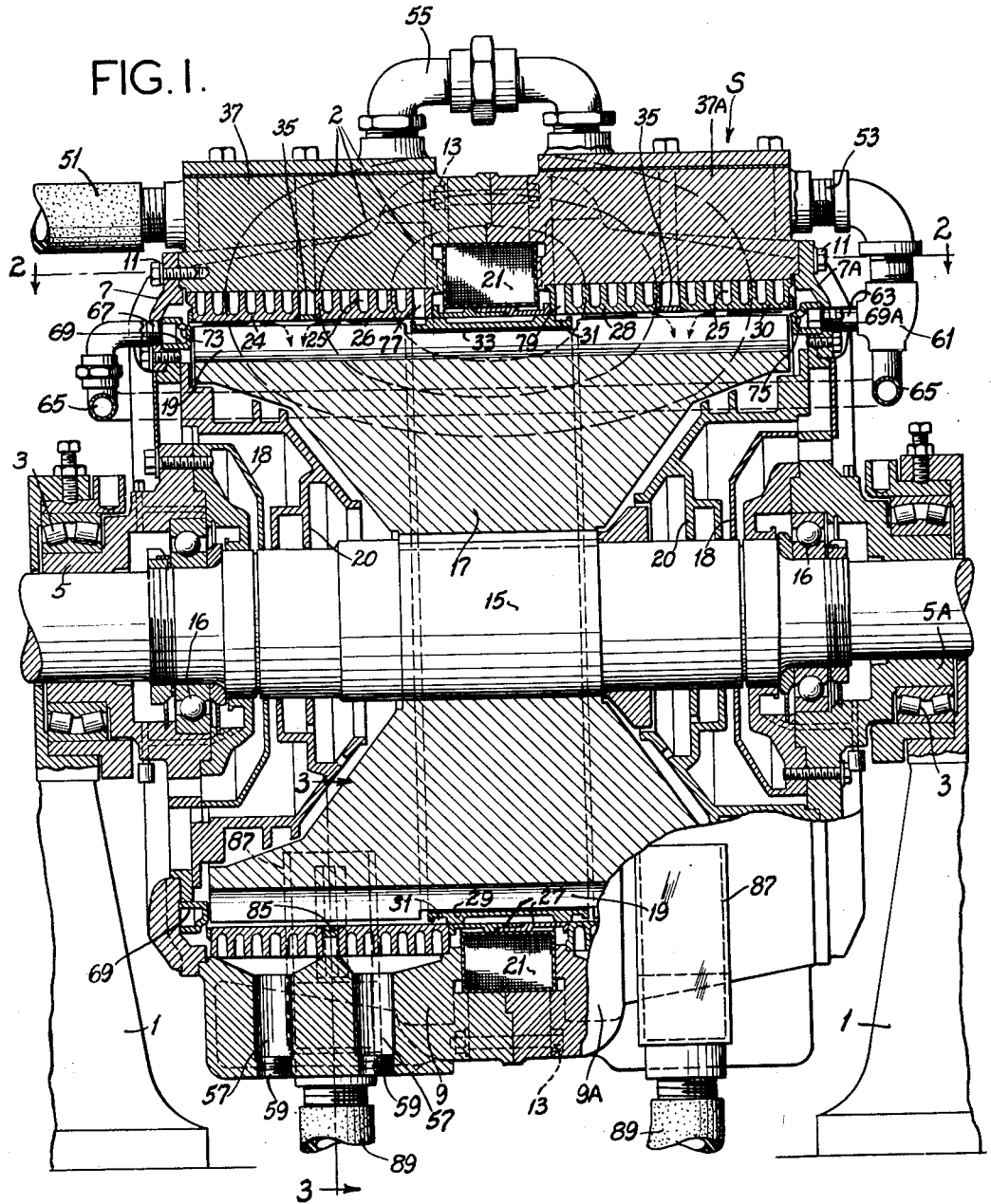

Referring now more particularly to Fig. 1, there are shown at numerals 1 supporting pedestals for bearings 3 in which are rotary hollow trunnions or hubs 5 and 5A. The bearings 3 allow the trunnions 5 and 5A therein to rock freely. The trunnions 5 and 5A form opposite extensions from end heads 7 and 7A respectively of a stator or inductive armature which as a whole has been indexed S.

The outside main body of the stator is made up of two rings 9 and 9A, to which the heads 7 and 7A respectively are bolted, as shown at 11. Bolts 13 hold together the sections 9 and 9A. Thus the parts 5, 5A; 7, 7A; 9 and 9A constitute the main structural portions of a rocking magnetic, hollow stator S. A suitable torque arm extends from the outside of the stator S (not shown) for applying force to a suitable scale from which constants may be read in the usual way for calculating horsepower absorbed. The rocking allowed is for operation of this torque arm.

Figure 3:
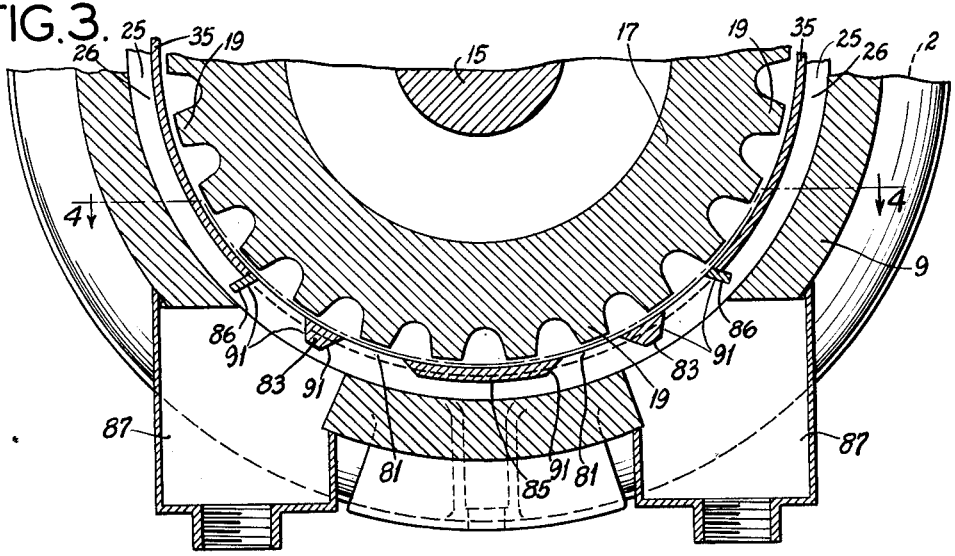
Fig. 3 is a fragmentary vertical section taken on line 3—3 of Fig. 1.

Passing through the trunnions 5 and 5A is a shaft 15 which is supported in bearings 16 within the trunnions 5 and 5A. The members 18 and 20 are shaft seals attached to each of the heads 7 and 7A. To the shaft 15 is keyed a rotor 17 having radially tapered teeth 19 (Fig. 3) extending axially (Fig. 1) from one end to the other of the rotor. The teeth 19 form polar members for concentrating a toric flux field surrounding an annular field coil 21. Typical cross sections of the flux field are shown by the dash lines 2 at the top of Fig. 1. Coil 21 is carried in the stator S, being located in recesses between the sections 9 and 9A.

The toric flux field interlinks the members 9 and 9A, teeth 19 and the magnetic rotor 17. This magnetic circuit is closed just outside of the teeth 19 through magnetic insert rings 24, 26, 28 and 30 which are grooved on their outsides as indicated at 25 but which have inside smooth cylindric surfaces. These smooth inside surfaces have immediately beneath them the inductive eddy-current regions and the grooves 25 form water passages behind these regions. The grooves 25 are closed exteriorly by the members 9 and 9A. The rings 24, 26, 28 and 30 have a close fit within the cylindric insides of members 9 and 9A, being telescoped into position where they are fastened by welding or the like.

Central circular inserts 27 between the rings 26 and 28 effect a water tight enclosure for the coil 21. Just within these inserts 27 there is located a circular distributor member 29 having endwise grooves 31 for water distribution purposes which will appear. The member 29 is cleared by recesses 33 in the teeth 19. It is suitably split (not shown) for assembly purposes. Partial bands 35 are welded between the rings 24, 26 and 28, 30 respectively. The flux field from coil 21 passes through the inner surfaces of rings 24, 26, 28 and 30 in concentrations effected by the polar character of the teeth 19. When the rotor 17 revolves the movements of these concentrations cause flux reactions and heating in this inner cylindric surface. The flux reactions transmit torque from the rotor to the stator while the heating absorbs mechanical energy.

Figure 2:
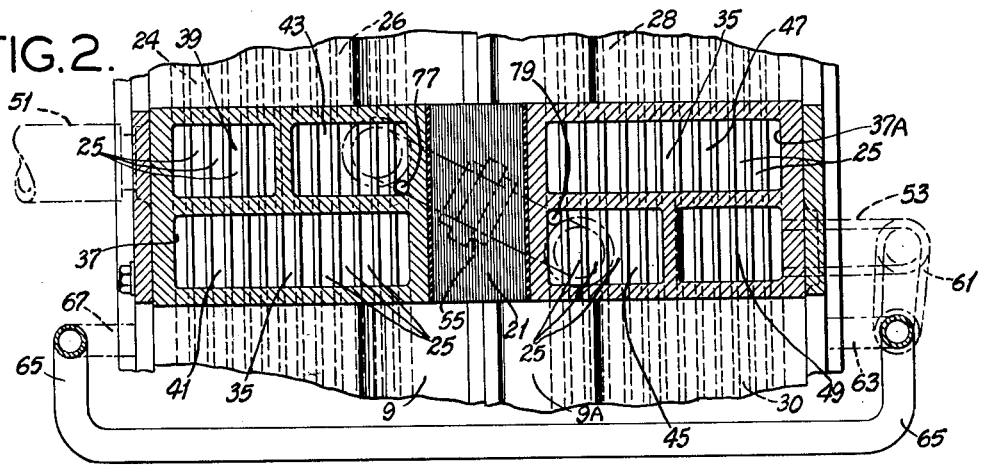
Fig. 2 is a fragmentary horizontal section taken on line 2—2 of Fig. 1.

On the upper sides of the sections 9 and 9A are formed water manifolds or boxes 37 and 37A respectively which form communications with the grooves 25. This feature is best shown in Fig. 2. Water box 37 has compartments 39, 41 and 43. Box 37A has compartments 45, 47 and 49. Compartment 39 of box 37 has a water inlet 51 and compartment 49 of box 37A has a water outlet 53. Water flows into the inlet 51 of compartment 39 and then around the grooves 25 of the first ring 24. It passes around to the compartment 41 and then to the right and around in the opposite direction through the grooves 25 of the second ring 26. It then comes up to the compartment 43. A cross connecting pipe 55 from compartment 43 to the compartment 45 in box 37A carries the water over to the box 37A. It then travels around the grooves 25 of the third ring 28, up to compartment 47, then in the opposite direction around the grooves 25 of the fourth ring 30 and up to compartment 49 where it escapes through the outlet 53. Thus this water passes outside of the inner cylindric heating surfaces and acts as a coolant. The drain openings 57 at the bottoms of the members 9 and 9A are for clean-out purposes and are ordinarily closed by plugs 59. They are respectively individual to the rings 24, 26, 28 and 30.

The outlet 53 is connected to a manifold 61, which has a branch pipe 63 passing into the head 7A. It has a second branch pipe 65 which passes to the other end of the machine and enters head 7 at 67. Hollow distributor rings 69 and 69A are attached respectively to the insides of the heads 7 and 7A and communicate with the inlets 67 and 63 respectively. These rings 69 and 69A have upper openings 73 and 75 therein which are closely adjacent to the spaces between the ends of the teeth 19 and the ends of rings 24 and 30.

The teeth 19 being on the spinning rotor 17 pick up the water thus introduced into the machine and whirl it around and distribute it as a thin film upon the insides of the endwise rings 24 and 30.

Water is also introduced by ports 77 and 79 from the water boxes 43 and 45 into the groove 31 of the central peripheral member 33. This water is picked up by the spinning teeth 19 and whirled in a thin film against the inside cylindric surfaces of the two innermost rings 26 and 28.

Figure 4:
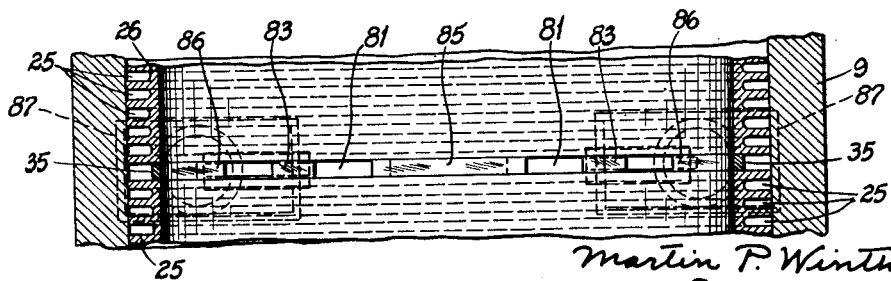
Fig. 4 is an ideal horizontal section taken on line 4—4 of Fig. 3.

Quickly to relieve from the machine the water thus introduced, before it builds up any substantial volume in the stator and floods it, crescent-shaped passages 81 are located in the lower mid-sections of the stator rings 9 and 9A. These are formed by the absence of lower sections of the welded rings 35. Thus the planes of these passages are respectively about midway between the points of entry of the water in the respective sections 9 and 9A. The passages 81 are best shown in Fig. 4. Welded into them are deflector and baffle pieces 83 and 85 and also lips 86 which prevent water which has once escaped through a passage 81 from bounding back again. The outwardly angled edges 91 of these deflectors 83, 85 and 86 in effect act as one-way water traps for either direction of rotation of the rotor. The openings between the edges 91 flare outward. Water may easily escape but substantially none can return. The passages 81 communicate with sumps 87 which are attached to the lower sides of the members 9 and 9A. From the sumps 87 the water drains out through suitable flexible hoses 89. The rate of water feed is such as to maintain a thin water film inside rings 24, 26, 28 and 30 without building up any head in sumps 87 which might flood the stator.

Operation of the form of the invention shown in Figs. 1-4 is as follows:

A prime mover or the like to be tested is attached to the shaft 15 and drives it and the rotor 17. The field coil 21 is electrically energized, whereupon its flux field interlinks the rotor and stator through the teeth 19 and rings 24, 26, 28 and 30. Since this field is concentrated by the polarizing effects of the teeth 19, and since the concentrations rotate, eddy currents are induced at the inner surfaces of the rings 24, 26, 28 and 30. These produce heat at the expense of mechanical energy abstracted from the prime mover. The electromagnetic reactions tend to rock the stator in the bearings 3 and its outside torque arm prevents rotation while applying force to the registering scale (not shown).

Part of the heat converted from work is abstracted from the machine by the water flowing around the outside of the eddy-current surfaces through the grooves 25 as above-described, the flow being by successive circuits in opposite directions.

The water which is bled off at openings 77 and 79 and enters the central inside part of the stator is whirled around by the central portions of the teeth and advances axially in opposite directions through rings 26 and 28. The water which is received from the pipe inlets 63 and 67 enters the opposite ends of the stator and is whirled around within rings 24 and 30 by the opposite ends of the teeth 19. Thus a thin cylindric film of water advances axially from the port 73 and another thin cylindric film advances axially in the opposite direction from the port 77. When these two advancing films reach the plane of the lower port 81 in the section 9 they escape. A similar action takes place with respect to the separate but oppositely moving films of water entering at the openings 75 and 79 in the other section 9A.

The result is that the exteriorly circulating water passing through the grooves 25 picks up some heat but not being closest to the inner eddy-current surfaces of the rings 24, 26, 28 and 30, where most of the heating occurs, this water does not absorb all of the heat of which it is capable. When it enters upon the inside surfaces of the rings it picks up more heat being in more intimate contact with these surfaces. It should at this point be understood that most of the heat is generated close to the inner surfaces of the rings 24, 26, 28 and 30. The result is efficient cooling at high energy-absorbing capacities without steep temperature gradients which would cause undue stresses and undesirable strains or distortions. Thus the machine may be operated with a smaller flux gap without interference difficulties arising at high capacities.

Another important feature is that the axial distance any given thin cylinder of water needs to flow through the machine is quite short. Thus there is not built up on the inside cylindric surfaces of the rings 24, 26, 28 and 30 any such substantial difference of water depth, as would necessarily occur with long axial passages in order to obtain the necessary axial hydraulic gradient for axial flow. Dipping of the teeth 19 into the water film may thus be held at a minimum at all points. This is an important feature because, if the teeth were at any point to dip too far into the water, an unsteady hydraulic dynamometer action would be engendered. Since steady action is one of the important advantages of eddy-current electric dynamometers over hydraulic dynamometers, it is important that, when cooling water is applied to the eddy-current surfaces, the undesirable hydraulic effect of pure hydraulic machines be not reintroduced. The rate of introduction of the water into the machine is not made greater than the capacity of the ports 81 to carry it off. Hence there is no building up of a water head which would flood the entire interior of the stator. In other words, by means of the present invention the thickness of water carried on the inside of the rings 24, 26, 28 and 30 is no greater than will just permit dipping of the ends of the teeth 19 therein without filling up the space between teeth. This allows the teeth to act as water spinners without hydraulic surging.

From the above it will be seen that as to the first form of the invention water is admitted from a total of four axially spaced points, two on sides toward the center of the machine and two towards the ends of the machine. It is abstracted at two lower points, each of which is between an end and central inlet. Thus the water film spreads substantially at uniform depth over the entire dynamometer cooling surface and no part of this surface is starved for water.

In addition, although the axial traverse of the water is quite short, its linear traverse through the machine is substantial since it may whirl around several times before it escapes. The axial traverse of the water in the machine of Figs. 1–4 is actually of the order of 5½ inches, which is substantially less than one-half the radius of the inner cylindric surface to be cooled.

Another point of importance is that of the angles 91 made by the edges of the pieces 83 and 85 which throw the water toward the outlet in such a manner that it will not rebound to cause a return into the magnetic gap. This eliminates any unsteady hydraulic reactions which would occur if the water were to return into the gap. This method of removing water from a completely smooth cylinder of iron inside the stator eliminates substantially all hydraulic drag and surging.

It should be noted that the peripheral edges of the rings 69 and 69A form dams which require the water to remain on the inside of the spaces of the adjacent cooling rings 24, 26, 28 and 30. These dams are stationary but are not connected to the cooling rings.

The inlet ports 73, 75, 77 and 79 may be either of two types. They may be such as to discharge the required amount of water freely without the necessity for building up much pressure drop across the ports. Such ports allow steady operation over a certain wide range of speeds. In some designs however, at certain speeds, hydraulic oscillations are set up due to obscure causes among which may be cavitation, uneven distribution of water masses, or suction effect due to the rotor acting as a pump drawing water through the magnetic gaps. I have found that unsteady operation in these designs may be avoided by designing the openings of inlet ports 73, 75, 77 and 79 with suitable restrictions so that they operate as throttling ports or spray nozzles. Due to the high pressure drop which is then required across each nozzle in order to force flow through them, surging is damped out. Thus forming these inlets as nozzles has the effect of a hydraulic surge damper, and may be used in designs requiring it.

Figure 5:
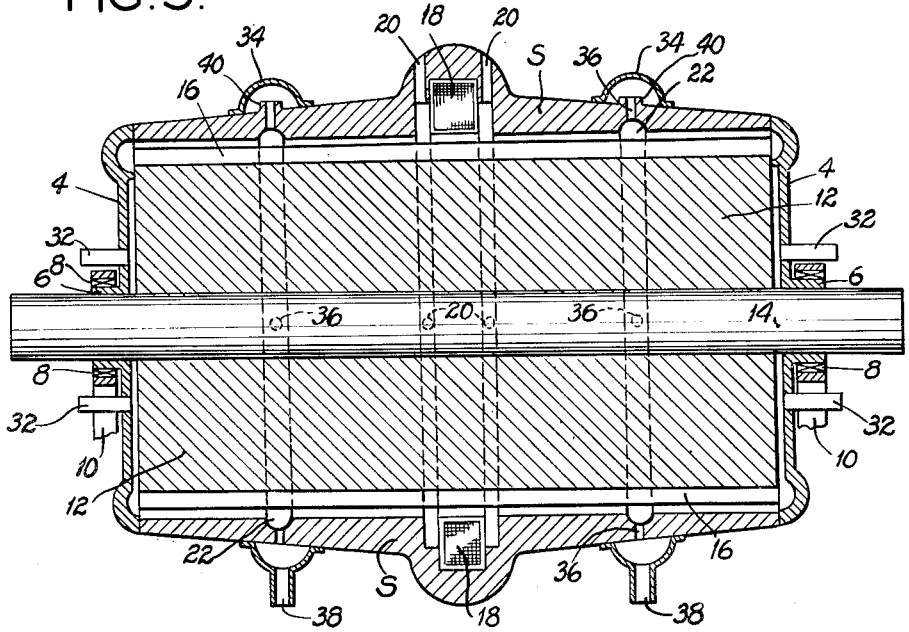
Figs. 5, 6 and 7 are diagrammatic longitudinal sections showing other variations of the invention; and, Figs. 8, 9 and 10 are vertical sections of other forms of the invention, being partly in elevation.
Figure 6:
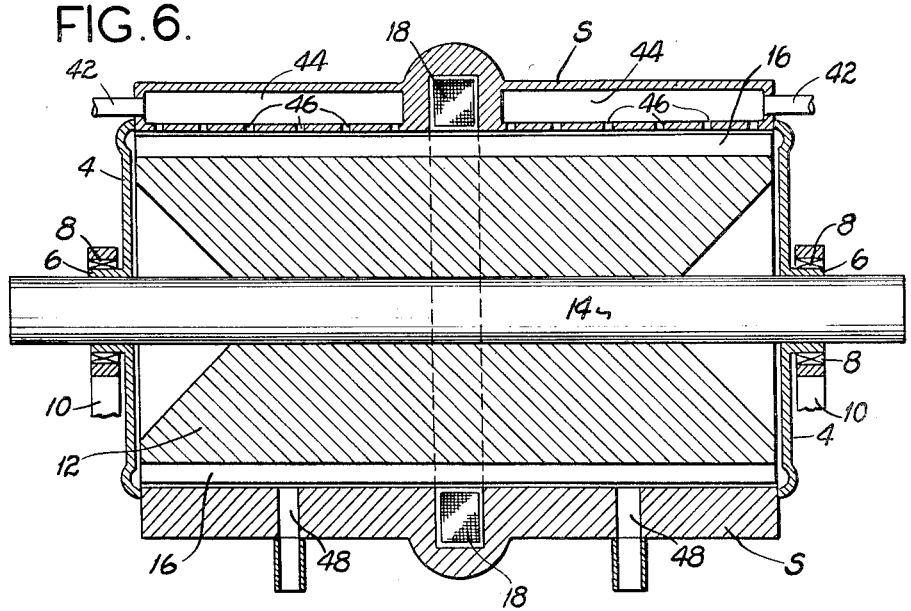
Figure 7:
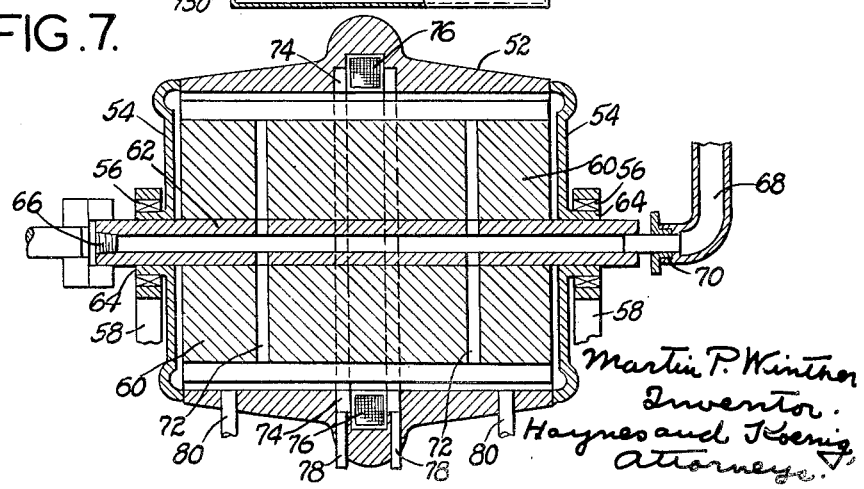

Figs. 5, 6 and 7 show alternative circuits wherein water cooling external to the heating surfaces is not employed. These figures are diagrammatic.

In Fig. 5, S indicates the rocking stator having heads 4 with trunnions 6 in bearings 8 located in pedestals 10. At the center of the stator or armature S is carried the annular coil 18 which provides the flux field interlinking the stator and the rotor. The axially toothed rotor is shown at 12, mounted upon shaft 14 which is rotary in the trunnions 6. The teeth are shown at 16. Some water is brought in centrally through openings 20. This water is whirled into a thin film inside of the stator, as in the case of Figs. 1–4, and proceeds axially in opposite directions to intermediate grooves 22.

Water is also introduced through openings 32 in the heads 4. This is spun out centrifugally and assumes the shapes of axial cylindric films on the inner surfaces of the stator. Water from each head 4 thus proceeds axially towards a groove 22. The grooves 22 are assocaited with exterior drainage belts 34 through openings 36, the water escaping at bottom drains 38. Thus, as in the case of Fig. 1, water is introduced at four axial points and withdrawn at two median axial points. In each water inlet or outlet plane as many inlets or outlets may be used as desired. It is of course clear that water traps of the type shown in Fig. 4 may be used in association with the outlets, if these become necessary. The use of peripheral channels such as 22 for leading water to the outlet, along with the plurality of outlets, substantially reduces the requirement for such deflectors and the like. Dams around the outlets 36, such as shown at 40, are an aid in preventing expelled water from falling by gravity back into the dynamometer. More outlets 36 and inlets 32 may be used if found desirable to prevent blocking up of desired free flow.

In Fig. 6 is shown diagrammatically another method of introducing water, in which S again represents the stator, 4 its heads, and 12 the toothed rotor, other numerals corresponding to those of Fig. 5 show corresponding parts. This Fig. 6 shows another method of introducing water to the magnetic gap which consists of longitudinal manifolds 44 on top of the stator with holes 46 located in an axial row. The water enters at 42. These holes introduce the water radially along most the entire length of the rotor. This water, as before, spreads out into a thin film, as whirled by the teeth of the rotor, and escapes at intermediate openings 48 at the bottom of the rotor. In order to escape such water again flows axially in opposite directions toward each outlet 48.

In this Fig. 6 construction, as mentioned in connection with Fig. 1, the inlet holes 46 may be made of the constricted-nozzle or spray type so that more pressure drop is required across a nozzle to force water through it. Thus, as in the case of Fig. 1, actuation of the rotor as a pump to draw water into the gap between it and the stator is prevented from causing surging. It is clear also that more resistance to in-drawing of the water into the gap by the rotor could be effected by reducing the number of inlets 46.

Another method of introducing water is shown in Fig. 7 wherein the stator is indicated at 52. It has endwise heads 54 in bearings 56 within pedestals 58. The toothed rotor is shown at 60 mounted on a hollow shaft 62 which is rotary in the trunnions 64 of the heads 54. The hollow shaft is closed at its driving end as shown at 66 and at its other end is supplied with water from a pipe 68 through a rotary packing gland 70. The gland 70 permits relative motion between the hollow shaft and a stationary water feed pipe 68. In this case passages 72 from the hollow shaft through the rotor transmit water centrifugally to the inner surfaces of the stator but only at a rate to maintain a thin film within the stator 52. This water spins and flows in two opposite axial directions. In the case of each passage 72, one part of the flow proceeds centrally to an exhaust belt 74 around the exciting coil 76 which is supported in the stator. This water escapes from a lower outlet 78. The other part of the flow of water from each passage proceeds oppositely and to one of the passages 80. Some of it traverses the space between the rotor and the heads 54. The feed of the water is such that a spray of water is spun centrifugally from the openings 72 to effect a uniform distribution of water along the inner cylindric surfaces of the stator.

Figure 8:
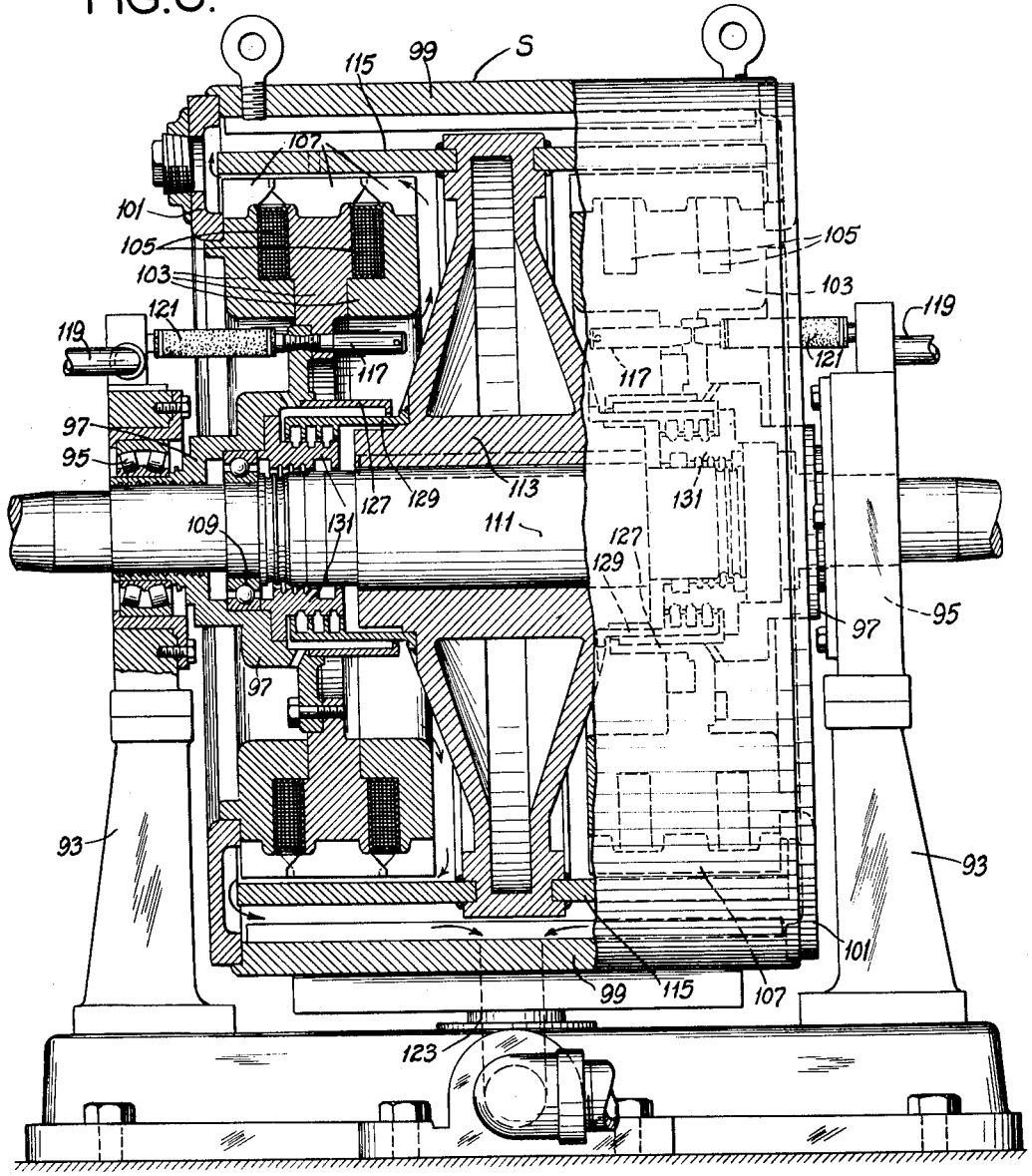

In Fig. 8 is shown a form of the invention in which the toothed or polar member is arranged on the stator and the cylindric inductive, eddy-current armature is rotary. In this case the pedestals are shown at 93 in which are bearings 95 for trunnions 97 of a rocking stator S. It is to be understood that the right-hand elevational portion of Fig. 5 is the same in cross section as the left-hand sectional portion. The rocking stator consists of an outer case 99, attached to and enclosing annular end rings 101. Rings 101 are respectively attached to three-piece magnetic rings 103, each of which carries two annular field coils 105. The magnetic rings 103 are supported upon the trunnions 97 which, as stated, extend into the bearings 95. Radially extending, polarizing teeth on the rings 103 are shown at 107. The polar teeth are of the overlapping type described in my United States patent application Serial No. 491,101, filed June 17, 1943, for Dynamometer. Further details of these will be unnecessary in view of their disclosure in that application and the fact that their broad functions are clear enough herein for the purpose of understanding of the invention by those skilled in the art.

Passing through the trunnions 97, and supported in the bearings 109, is a shaft 111 to which is keyed the central spider 113 of a double-ended rotor. Extending oppositely from the spider 113 are eddy-current armature sleeves 115 forming magnetic gaps with respect to the polar teeth 107. These are interiorly cylindric. Flux circuits around the coils 105 interlink the rings 103, teeth 107 and cylindric eddy-current members 115. Thus when the shaft 111 is turned, the rotor 113, 115 turns and the relative motion of the flux concentration within the smooth interiors of the rings 115 sets up eddy currents therein with the heating and magnetic reactions which apply torque to the stator S. A difference in this case is that the eddy-current members rotate instead of the toothed members. The latter only rock a limited amount.

Cooling water is introduced through pipes 117 attached to the stator rings 103. Water inlet pipes are indicated at 119. These are mounted upon the stationary pedestals 93. Flexible connections 121 communicate water to the pipes 117 and allow the desired rocking motion of the stator S.

Water introduced through the pipes 117 is caught by the rotating spider 113 and moves centrifugally as indicated by the arrows to central points within the inner surfaces of the sleeves 115. Here the water spreads out into the desired thin film and progresses axially to the annular rings 101. Here it escapes from the sleeves 115 and descends down into the bottom of the machine where it runs endwise from both ends toward the center and out of a lower outlet 123. The outlet connections are made flexible to permit of said rocking. This form of the invention partakes of the advantages of the forms already described in respect to the low hydraulic surge effect. This is because the stator is not flooded and a thin film of water is maintained on the insides of the sleeves 115 which is no deeper than the magnetic gap. In this case it is not necessary for the teeth 107 to dip into the water at all, since they are not depended upon for whirling it centrifugally. But the teeth can, under some conditions be allowed to dip in the film, by which means a certain amount of water can be scraped off and allowed to run down over the coil structure for cooling purposes.

Referring to Fig. 8, numerals 127 and 129 indicate gland sleeves connected respectively to the trunnion 97 and the spider 113 to prevent water from reaching the bearings. Additional gland members 131 are attached to the trunnion 97 to inhibit access of water to the bearings.

Figure 9:
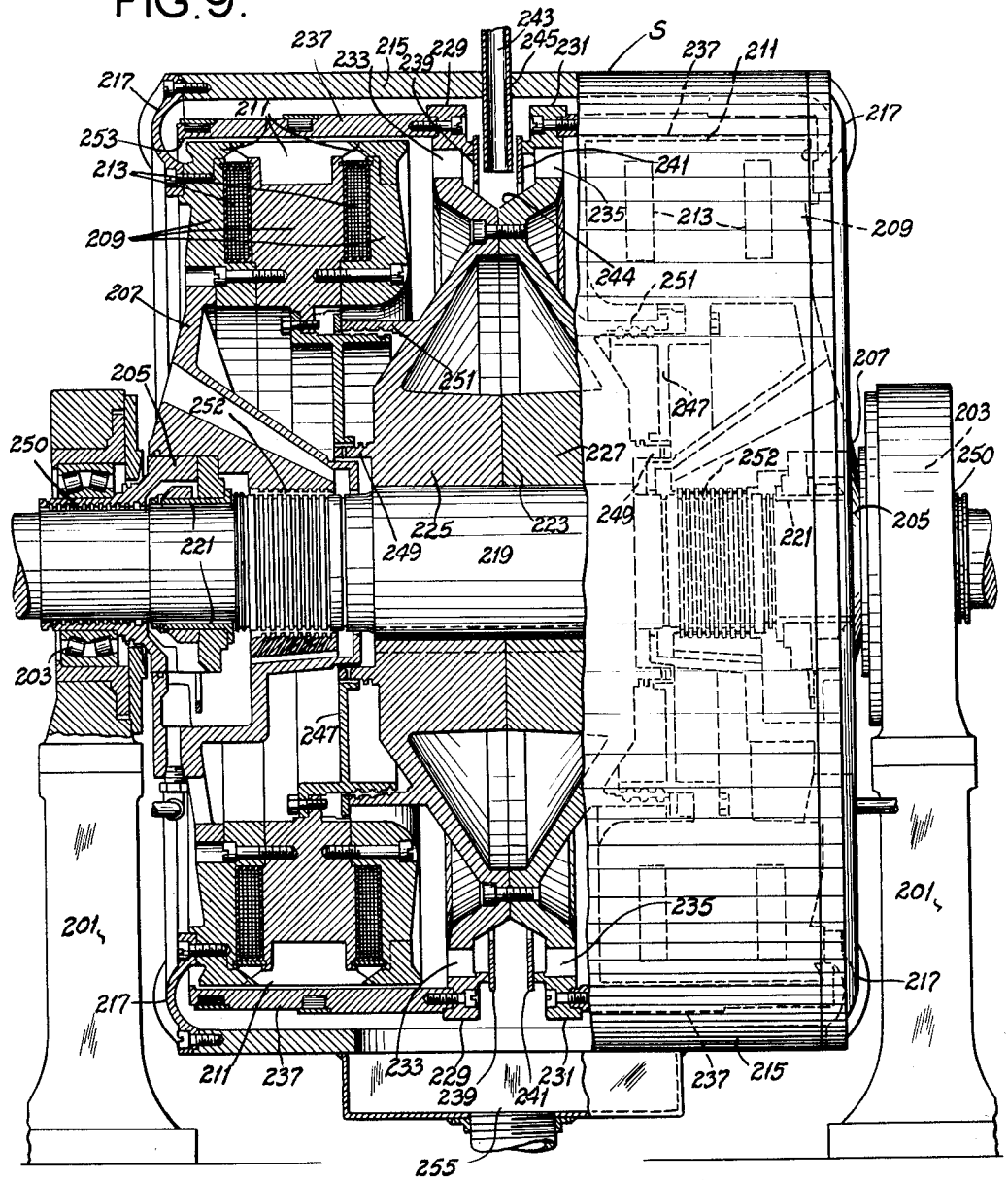

In Fig. 9 is shown a form of the invention in which numerals 201 indicate the pedestals whereing are bearings 203 for trunnions 205 which form extensions from heads 207, the latter each carrying composite magnetic ring units 209. The rings 209 carry polar teeth 211 and support annular field coils 213. They are attached to an outer case 215 by means of annular members 217. The stator S thus formed rocks on the trunnions 205 in the bearings 203. A rotary shaft 219 is supported in sleeve bearings 221 carried in the heads 207. Carried on the shaft 219 and rotary therewith is a central spider 223 made up in two bolted parts 225 and 227. The parts 225 and 227 are formed at their peripheries as separated flanges 229 and 231 with axial openings 233 and 235 therein. Eddy-current cylinders 237 are bolted upon the flanges 229 and 231. These cylinders are internally smooth and cylindric and cooperate with the teeth 211 by means of the usual magnetic gap. Attached to flanges 229 and 231 are rings 239 and 241, between which is inlet pipe 243 which passes through an opening 245 in the case 215. A flexible inlet water pipe is attached to 243. A slotted hole could be cut in 215 so that 243 could be fixed by an external support so that the case 215 could swing without touching pipe 243. Hence we would have a means of introducing the water without the use of any hose, and this would be highly desirable. This could also be arranged in the Fig. 8 construction.

Extending from the composite ring 209 is a labyrinth member 247 which cooperates with members 249 and 251 on the spider 223 to prevent water from reaching the bearings. Further shaft seals are shown at 250 and 252.

The spider 223 may be rotated with the drive shaft 219, thereby rotating the eddy-current cylinders 227 with respect to the rocking stator S which includes the polar teeth 211.

Water entering the inlet 243 passes between the rings 239 and 241 and into the V-shape 244 and is then forced centrifugally through the openings 233 and 235. Any water that finds its way down to the member 251 is trapped and thrown out centrifugally. The main centrifugal action almost immediately carries the water into contact with the inner cylindric surfaces of the eddy-current member 237, along which it creeps in a thin film on to a low dam member 253. Here it spills out centrifugally through the passages formed by the annular rings 217. From this point the water descends to the bottom of the machine where it flows axially toward the center and is drained out through sump 255. The flow of water is regulated to provide the desired film. In this form of the invention the water is injected radially into the center of the machine and flows axially in opposite direction towards the end. In Fig. 8 the injection is axial and central.

Figure 10:
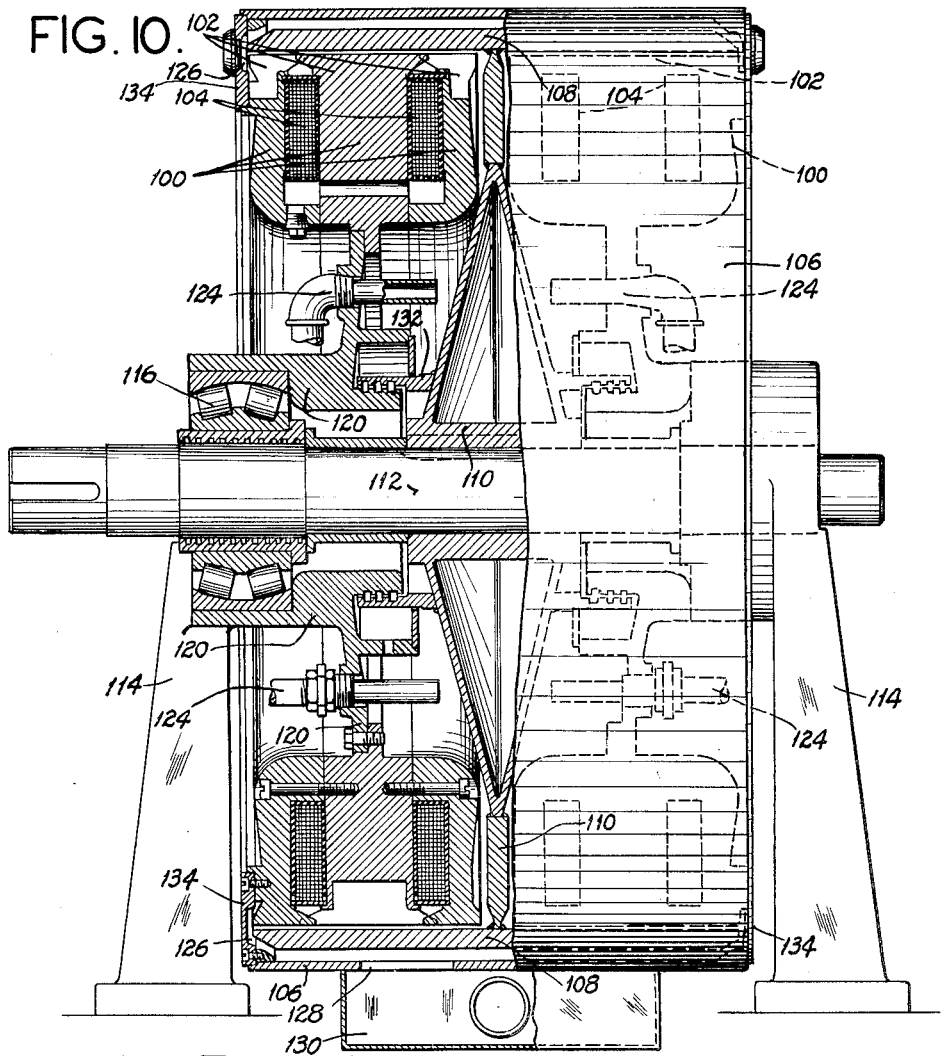

In Fig. 10 is shown another and last form of the invention applied to an electromagnetic brake, although the same principle can be used in the case of a dynamometer. In this construction the composite toothed field member is shown at 100. It is stationary, being carried upon a stationary bracket 120. Its flux-concentrating teeth being shown at 102 and its annular field coils at 104. The right-hand end of the machine is symmetrical with respect to the left-hand end. This field member is therefore stationary and has a surrounding stationary cover 106 connected thereto by means of stationary end rings 134. The brake armature in which eddy currents are generated is a continuous cylinder 108 carried centrally upon a spider 110, which in turn is keyed to a shaft 112. The shaft 112 is supported in pedestals 114 by bearings 116. Bearings 116 are located between a stationary support 120 and the shaft. A water seal is shown at 132. Thus the shaft 112, spider 110 and eddy-current armature 108 are rotary between the field parts 120, 100, 104 and 102 and within the stationary members 106 and 134.

Water is introduced at the stationary inlets 124 attached to the stationary member 120. It is thrown out centrifugally by the spider 110 on each side of the machine. It is to be understood that the side of the machine shown in elevation in Fig. 10 has the same cross section as the left-hand side and has duplicate water connections. Water finds its way out to the inner surface of the eddy-current armature 108 and progresses axially in a thin film to each open end indicated at 126. It spills centrifugally over into the inside of the case 106 and proceeds by gravity down to outlets 128 associated with a sump 130. In this case the teeth 102, also being stationary, do not act as spinners for the water and it is distributed by centrifugal force in thin cylindric films over the inside of the armature 108.

In the case of this Fig. 10 construction, as in the other forms, the heat is carried away very readily and rapidly and the armature is kept cool. The armature being of light construction has a low inertia and hence may be used as a brake for the shaft 1. This allows for quick decelerations and fast accelerations.

In any dynamometer applications, the stationary type of field member of Figs. 8, 9 and 10 permits it to be designed to use very high magnetization currents. Hence it is possible to build up very high torques at low speeds using the invention either as a dynamometer or brake.

It is to be understood that the term "armature" as used herein refers to the eddy-current member in which heat is generated, regardless of whether this member is stationary or rotary. The term "field member" is applied to the member which is arranged with polar surfaces and from which the magnetic flux issues in concentrations to enter the armature. Under these definitions the coil which produces the flux field may be on either the eddy-current member or the field member.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Eddy-current apparatus having relatively rotary armature and field-concentrating members, the armature member being outside of the field-concentrating member and having inside surfaces heated by eddy currents caused by the field member, inlet means for introducing water at several substantially spaced axial points within the armature member for centrifugal movement against its inside surface and outlet means at several other axial points for receiving water from the several inlet points and permitting escape of said water from the armature.

2. Eddy-current apparatus having relatively rotary armature and field-concentrating members, the armature member being outside of the field-concentrating member and having inside surfaces heated by eddy currents caused by the field member, inlet means for introducing water at several substantially spaced axial points within the armature member for centrifugal movement against its inside surface, said armature having peripheral water passages behind its heated surfaces, and means whereby water is conducted through the machine serially first through at least some of said passages in the armature and then in multiple streams over said heated surfaces.

3. In eddy-current apparatus having relatively rotary armature and field-concentrating members, the armature being outside of the field-concentrating member and having an inside surface heated by eddy currents caused by the field-concentrating member, means for introducing cooling liquid to the inside surface of said armature member in quantities which are spread centrifugally into a thin film, the introduction being at least at two inlet points within said armature, and means for abstracting water from said armature through at least two outlets spaced axially with respect to said inlet points.

4. Eddy-current apparatus comprising an outside armature having an inside eddy-current surface, a flux-concentrating field member within said armature, said members being relatively rotary, means for introducing a cooling medium to the interior of the armature in at least two planes, and means for removing water from the interior of the armature in at least two other planes such that the axial flow of water within the armature between any pair of inlets and outlets is never greater than the radius of the machine.

5. Eddy-current apparatus comprising a stationary armature having inside eddy-current surfaces and having water circulating passages around said surfaces and behind them, a flux-concentrating field member rotary within the armature, means for circulating cooling liquids through said passages in the armature, means located at a plurality of points for introducing said cooling liquid after passage through the armature into the space between the armature and the field member, the rate of introduction being such that a thin film of cooling medium is produced on the inside of the armature by centrifugal action of the field member, and means for abstracting water from the inside of the armature at a plurality of points axially spaced with respect to said points of introduction.

6. Eddy-current apparatus comprising a stationary field member, flux-concentrating means on the field member and arranged in at least two spaced circles in said member, separate field coils located respectively at said circles, a rotary spider between said spaced circles, armature cylinders extending oppositely from said spider and respectively cooperating electromagnetically with said flux-concentrating means, means for introducing cooling liquid near the spider whereby the liquid will proceed centrifugally in thin cylindric films toward the ends of said armature cylinders, and a stationary enclosure connected with the ends of said field member and surrounding said cylindric members and spider for carrying cooling liquid from the machine.

7. Eddy-current apparatus comprising a stationary field member, radially directed flux-concentrating means on the field member and arranged in at least two spaced sections, separate field coils organized with said respective sections, a rotary spider between said sections, armature cylinders extending oppositely from said spider and respectively cooperating electromagnetically with said sections and surrounding them, and means for introducing cooling liquid near the spider and between said sections and onto the internal surfaces of said cylindric extensions, whereby the cooling liquid may proceed in thin cylindric films toward the ends of said armature cylinders, and a stationary enclosure connected with the ends of said field sections and surrounding said cylindric members and spider for carrying cooling liquid from the machine, and means for introducing said water radially through said enclosure and at the central plane of said spider.

8. Eddy-current apparatus comprising a stationary field member, radially directed flux-concentrating means on the field member and arranged in at least two spaced belts, separate field coils organized with said respective belts, a rotary spider between said belts, axial armature cylinders extending oppositely from said spider and respectively cooperating electromagnetically with said belts of flux-concentrating means, means for introducing cooling liquid near the spider whereby the liquid may proceed in thin cylindric film towards the ends of said armature cylinders, and a stationary enclosure connected with the ends of said field sections and surrounding said cylindric members and spider for carrying liquid from the machine.

9. Eddy-current apparatus comprising a stationary field member, radially directed flux-concentrating means on the field member and arranged in at least two spaced belts, separate field coils organized with said respective belts, a rotary spider between said belts, armature cylinders extending oppositely from said spider and respectively cooperating electromagnetically with said belts of flux-concentrating means, means for introducing cooling liquid from opposite ends of the machine through said belts into position near the spider whereby the liquid may proceed in thin cylindric films toward the end of said armature cylinders, and a stationary enclosure connected with the ends of said field sections and surrounding said cylindric members and spider for carrying liquid from the machine.

10. Eddy-current apparatus comprising a cylindric armature having an internal eddy-current surface, an annular field coil carried by said armature in a central plane, a rotary polar field member within said armature, means for introducing cooling liquid between the armature and field member at points on opposite sides of said field coil and relatively spaced, and means for abstracting liquid from points on opposite sides of said field coil and also relatively spaced both with respect to each other and said points of entry of the liquid.

11. Eddy-current apparatus comprising a cylindric armature having an internal eddy-current surface, an annular field coil carried by said armature in a central plane, a rotary polar field member within said armature, means for introducing cooling liquid between the armature and field member at points on opposite sides of said field coil and relatively spaced, and means for abstracting said liquid from points on opposite sides of said field coil and also relatively spaced both with respect to each other and said points of entry of the liquid, said liquid being introduced through said field member.

12. Eddy-current apparatus comprising a cylindric armature having an internal eddy-current surface, an annular field coil carried in a central plane by said armature, a rotary polar field member within said armature, means for introducing cooling liquid between the armature and field member at points on opposite sides of said field coil and relatively spaced, and means for abstracting said liquid from points on opposite sides of said field coil and also relatively spaced both with respect to each other and said points of entry of the liquid, and means for introducing the liquid through said armature member.

13. Eddy-current apparatus comprising a cylindric armature having an internal eddy-current surface, an annular field coil carried by said armature in a central plane, a rotary polar field member within said armature, means for introducing cooling liquid through the field member and into position between the armature and field member at points on opposite sides of said field coil and relatively spaced, and means for abstracting said liquid from points on opposite sides of said field coil and also relatively spaced both with respect to each other and said points of entry of the liquid.

14. In eddy-current apparatus having relatively rotary armature and field-concentrating members, the armature being outside of the field-concentrating member and having an inside surface heated by eddy currents caused by the field member, substantially throttling inlet means for introducing water at several axial points within the armature member for centrifugal movement against its inside surface, and a substantially unthrottled outlet means spaced axially from said inlet means and permitting escape of said water from the armature.

MARTIN P. WINTHER.

DISCLAIMER 2,367,163.—*Martin P. Winther*, Waukegan, Ill. ELECTROMAGNETIC APPARATUS. Patent dated Jan. 9, 1945. Disclaimer filed Aug. 13, 1947, by the patentee.
Hereby enters this disclaimer to claims 11 and 13 in said specification.
[*Official Gazette September 23, 1947.*]